United States Patent
Lowe et al.

(10) Patent No.: US 7,058,412 B2
(45) Date of Patent: Jun. 6, 2006

(54) COMBINED ADVERTISING AND ENTERTAINMENT SYSTEM NETWORK

(75) Inventors: Danny D. Lowe, Calgary (CA); Todd G. Simpson, Calgary (CA)

(73) Assignee: ClubCom, Inc, Pittsburgh, PA (US)

( * ) Notice: Subject to any disclaimer, the term of this patent is extended or adjusted under 35 U.S.C. 154(b) by 549 days.

(21) Appl. No.: 09/965,775

(22) Filed: Sep. 27, 2001

(65) Prior Publication Data
US 2004/0229568 A1 Nov. 18, 2004

Related U.S. Application Data

(60) Division of application No. 09/161,892, filed on Sep. 28, 1998, now Pat. No. 6,298,218, which is a continuation-in-part of application No. 08/769,774, filed on Dec. 18, 1996, now abandoned.

(51) Int. Cl.
*H04Q 7/20* (2006.01)
(52) U.S. Cl. ............... 455/456.3; 455/3.01; 455/414.2; 455/125
(58) Field of Classification Search ............... 455/41.2, 455/41.3, 450, 463, 464, 500, 509, 511, 515, 455/123, 125, 456.3, 3.01, 3.02, 3.03, 3.04, 455/3.06, 517, 456.6, 456.2, 452.1, 422.1, 455/404.1, 414.2
See application file for complete search history.

(56) References Cited

U.S. PATENT DOCUMENTS

| | | | |
|---|---|---|---|
| 3,245,157 A | 4/1966 | Laviana ........................ 35/9 |
| 4,412,631 A | 11/1983 | Haker ........................ 221/66 |
| 5,410,735 A | 4/1995 | Borchardt et al. ............ 455/42 |
| 5,491,839 A | 2/1996 | Schotz ........................ 455/66 |
| 5,510,828 A | 4/1996 | Lutterbach et al. ........... 348/13 |
| 5,682,603 A | 10/1997 | Sano ........................ 455/38.2 |
| 5,758,290 A | 5/1998 | Nealon et al. .............. 455/464 |
| 5,852,506 A * | 12/1998 | Testani et al. .............. 455/509 |
| 6,006,100 A * | 12/1999 | Koenck et al. ............. 455/466 |
| 6,141,357 A * | 10/2000 | Testani et al. .............. 455/502 |
| 6,749,122 B1 * | 6/2004 | Koenck et al. ............. 455/466 |

FOREIGN PATENT DOCUMENTS
| | | |
|---|---|---|
| WO | 9601032 | 1/1996 |
| WO | 9844477 | 10/1998 |

* cited by examiner

*Primary Examiner*—Edward F. Urban
*Assistant Examiner*—John J. Lee

(57) ABSTRACT

A wireless remote unit is operable to demodulate signals received over a plurality of different bands, such as the FM broadcast band, and one or more higher frequency bands. The various bands have different channels and the selection of the band and the channel is accomplished by control signals received by the receiver. The control signal can carry menu information in one direction to the user and can carry user data, including the identity of the user, in the other direction. There can be multiple transmitters, wherein each transmitter sends information on a different channel within a band, and tunes remote units to a particular transmitter based upon proximity to that transmitter. The transmitter is capable of displaying visual data. The visual data includes a predetermined number of advertisements to be displayed during a user session, prompted either by a user logging onto the system, or by the system's detection of a user's presence.

12 Claims, 4 Drawing Sheets

COMBINED ADVERTISING AND ENTERTAINMENT SYSTEM NETWORK

RELATED APPLICATIONS

This application is a divisional application of U.S. Ser. No. 09/161,892 filed Sep. 28, 1998, now U.S. Pat. No. 6,298,218, which is a continuation-in-part application of U.S. Ser. No. 08/769,774, filed Dec. 18, 1996.

TECHNICAL FIELD OF THE INVENTION

This invention relates to a system and a method for advertising and other content on an entertainment unit, and more particularly to such systems where data transmission is to a receiver which can receive the data on a selected one of a plurality of frequencies or channels.

BACKGROUND OF THE INVENTION

The use of headsets or headphones to listen to prerecorded audio programs has become commonplace. Sometimes this use is because the listener is mobile and listening to a tape or CD, usually walking or running, and there is no fixed radio receiver available. Sometimes the user is at a sports event, such as a football or baseball game and uses the headset to listen to an AM or FM broadcast of the game. In some instances, the listener is within a gym or other building where either the traditional broadcast bands are blocked or distorted or where there are other available bands, such as a higher frequency carrier (for example the 900 MHZ band) which is carrying programs or other information unique to the local facility. This "other" information can be music channels, instructions for the use of certain equipment, directions for following a detour, audio component of an advertisement, or a walking tour of an art exhibit, etc.

Often, in such environments, it is necessary to change from one channel to another (or one band to another) once, twice, or several times, perhaps depending upon what material content the user desires to listen to, or watch.

A major problem in gyms, stock brokerage houses, factories, and other places where many people gather is to allow each individual person to listen to or view, a unique audio or video program without interference with other people in close proximity. Furthermore, advertisers are often unable to get an attentive audience, especially if the product or service does not appeal to the particular individual. Therefore, in such facilities, there is a need to provide entertainment on an individual basis to the users and also to provide advertisers with a captive audience.

U.S. Pat. No. 5,410,735, issued on Apr. 25, 1995 to Robert L. Borchardt, which is hereby incorporated by reference herein, is one example of a portable headset designed to receive a 900 MHZ signal for the purpose of allowing the user to listen to programs at a distance remote from a local transmitter.

The problem discussed above exists in applications other than traditional radio. For example, many portable processors store information in a memory and need to communicate that information to a fixed unit, or to a plurality of fixed units, each possibly operating on different bands, or on different channels, within the same band.

One specific example of such a problem is a gym environment where there are multiple work stations and many users. Presently, it is common practice to place a video display, such as a television, in a location having common visibility from a number of stations. This situation does not allow a user to have individual data, such as video or audio, communicated only to that user. Consequently, advertisers are unable to target their audience based on the needs of the particular individual. This results in users either changing the channels or switching off the device. Therefore, a seller is unable to get a captive audience for his products.

Assuming that a plurality of data transmission devices were to be made available to a like number of work stations, then a user at such a work station could view, or listen to, data of that user's choice. In such a situation, data (e.g. sound and pictures) from one transmission device would interfere with data from other devices. The solution to this problem is the use of headsets, preferably wireless headsets. A system is required that can differentiate one user from the next, so that each user would see and hear program materials unique to that user.

Further, since some of the information that a user desires is unique to that user, a system is required to identify that particular user.

Thus, a need exists in the art for a data receiving device, that is multi-modal in that it can be used to receive data on several different channels, with the user being able to control the selection of at least one of the currently operating channels.

A further need exists in the art for such a system in which the information content that the user desires to hear or see serves to select the band, or the channel within a band, that is operable at a particular point in time.

A still further need exists in the art for such a system in which the physical position of the user serves to select the band, or the channel within a band, that is operable at a particular point in time.

A still further need exists in the art for advertisers to be able to target their audiences based on the particular needs of the individual user.

A still further need exists in the art for advertisers to have a captive audience in order to effectively convey their message.

A still further need exists in the art for a system which detects the presence of a user without a headset in proximity to a transmitter so that the user can be targeted with a different type of advertising.

SUMMARY OF THE INVENTION

These and other problems have been solved by having a multi-channel data receiver device within, for example, a headset or a video display, allowing the channel to be selected by a signal received by the headset or the display. In one embodiment, this signal is an out-of-band infrared (IR) signal. Contained within the IR transmission is data pertaining to the band and/or the desired channel within that band. In an alternative embodiment, the control signal could be received on a fixed tuned channel within a certain band, or within each of the available bands, or in response to a temporary coupling between the transmitter and the receiver, during which time data is exchanged between the two devices.

As an example, assume a person using one of many treadmills (or other exercise equipment) in a gym or club environment is also using a headset. The person would step onto the treadmill (or otherwise come within proximity to the treadmill) and, in one preferred embodiment, an IR signal from a sender unit mounted on the treadmill would be received by the headsets of the user. In an alternative preferred embodiment, the headsets would be brought into physical contact (or near physical contact) with the treadmill mounted unit (transmitter) and data exchanged between the treadmill unit and the headsets. In another preferred embodiment, the person would step onto the treadmill (or other exercise equipment) and push a button on the treadmill to initiate data transfer between the headset and the treadmill. A touch sensitive screen could be used in place of the button.

In yet another embodiment, when a person without a headset steps on the treadmill, an ultrasound, or other user presence detection interface would detect the presence of the user in proximity to the treadmill and trigger the display to light up.

In the following, Full Effect advertising refers to advertising containing full motion video with stereo sound included. Video Effect advertising refers to advertising containing full motion video or "billboards" without sound. The term "billboard" in this context refers to a fixed video image, in contrast to video which incorporates motion.

For those users with headsets, the received IR signal (or the physically coupled data transfer) would tune the headset to the channel, within the audio signal band, that is unique to that particular treadmill, and, in the other direction, identify the user to the unit associated with the treadmill. During this time the entertainment unit on the treadmill will synchronize with an advertising server. This advertising server would feed advertisements to the entertainment unit, based upon the user's demographics. The advertisements would comprise full motion video or billboards, with or without sound. The synchronization step is required to ensure that advertisements are always viewed from beginning to end, or chronologically. To mask the delay of synchronization, a "welcome" screen will be presented to the user which will display, among other things, information unique to the particular user and/or the particular piece of equipment. This screen would also allow the user time to put on and adjust the headsets, adjust clothing, and perform other similar personal adjustments, before starting the exercise routine.

In the most flexible embodiment, each system or workstation would have a dedicated channel to allow advertising to be targeted directly to a particular individual. In a less flexible embodiment, fewer channels are shared between multiple systems. The synchronization step would then include time division multiplexing of the advertisements between the different users, to provide individually targeted advertisements. In either case, the system can record exactly which advertisements have been displayed to which user. Also, the entertainment system will disable other functionality so that the user cannot switch channels or adjust the audio signal while the advertisements are playing. This provides the advertisers with a captive audience. Of course, in case of an emergency, the advertisements could be interrupted to display emergency messages. The entertainment system is switched to the full effect advertising channel until a predetermined number of advertisements have played, or a predetermined amount of time has elapsed. A full effect advertisement includes full motion video or billboards with stereo sound.

Once the predetermined advertisements have played, information unique to that transmitter (e.g. workstation or treadmill) would be received by the user. This then would allow the user to select from a menu of programs displayed at that treadmill. One such program could be operating instructions for that machine. Other programs could include broadcast or cable television programs, and/or selections from a library of pre-recorded programs maintained at the gym or server location. Further programs could include the user's personal CDs, VCR tapes, cassette tapes or DVDs, or video on demand which would be available from an entertainment unit mounted on or near the treadmill. Audio from the sender unit would then be sent over the selected frequency to only that particular user. In this manner, the headsets are tuned to the precise transmitter, i.e., the treadmill sending unit, and would not receive transmissions from adjacent units.

In another embodiment, the system could be designed so that the control signal sending unit also could be a transceiver so as to receive information sent from the user. Such information could be program preferences of that user or could be the unique identity of that user. Based upon the received information, the system could reference a database and provide to the user information unique to that particular user, for example, a specific exercise routine or specially targeted advertisements. In addition, the unique information could be audio or video from a personal trainer at a remote location or advertisements from an advertising server, employing a cable or satellite source, and directed by the identity of the user.

In situations where a database has identified a user, either by IR transmission, or by a direct (or physical touching) contact, or via a sensor, the database can keep track of the user's performance from session to session. This would allow the database to provide visual and/or audio information to the user and if desired, a written confirmation to a third party, such as a doctor, trainer, or insurance company. The database could also keep track of the number of times a particular user has watched a particular advertisement. Such a database would also permit the tracking of which advertisements a user has watched, thus allowing multipart or serial advertisements to be played in sequential order. The database would also be able to provide information to a third party, such as a server administrator or an advertiser, regarding user profiles and also regarding updating/changing particular advertisements. Also, if the server contains user banking information, the system could be used to enable direct sales of products or services. In this case, a personalized PIN (Personal Identification Number) would verify the identity of the user. The data exchange between the database and the third party could be by e-mail or other electronic transfer or could be by a printed report.

For systems where the database learns the identity of the user, messages can be passed, again visually or audibly, to the user over the unique channel. If a microphone were to be incorporated in the base unit, a telephone patch could occur via a switched circuit controlled by the database which would identify the channel to which the user's headsets are currently tuned.

The system could be designed so that the transmitter could only turn on or wake up, when a properly identified receiver is in its presence and, if desired, would turn off or enter a sleep mode, when a headset is no longer present. The system could also be designed so that the transmitter or entertainment unit would turn on when it senses the presence of a user in close proximity and turn off when no person is in close proximity.

In situations where the headset is used in a more mobile environment, for example when moving through an art gallery or the like, each exhibit (or group of exhibits) could transmit a control signal changing the frequency of the headsets adjacent to that exhibit. The user would simply move around the gallery at his or her leisure and receive information available as desired. The user could request additional information as desired by sending signals over the out-of-band signaling device.

This same headset device could be used to receive data over the FM or AM bands at times when the "special" bands are not available or when the user did not desire to use the special bands. For example, at a ball game, the listener might prefer listening to the conventional over the air broadcast on a commercial station or might, instead, desire to use an in-the-ballpark band for receipt of special information. To switch to the special band, the user need not know what channel or channels are available since the in-park system is constantly transmitting information and the user simply needs to tell his/her own headset, perhaps by operating a switch, to switch to the in-park system. The headset then decodes the data coming from the ballpark system on a known channel, or on a known out-of-band channel, and changes the user's headset to the proper special channel.

When the user is listening to the regular broadcast band and has the unit's transfer switch set, the unit will automatically transfer to a band (or channel) selected by a signal received external from the transmission. Thus, upon entering a gym and having the transfer switch set, the headset will automatically switch to the in-gym band, and to a specific channel within that band, giving the user directions, instructions, or simply additional programming choices.

However, there are other situations where people do not have their headsets with them when they are exercising. Moreover, sometimes the user is a first time user that does not possess a headset. The present invention accommodates these situations as well. In situations where a user approaches the entertainment system without a headset, the system senses that someone is nearby via use of an ultrasound or other user presence detection interface. Upon recognizing a user without a headset, the video display will light up. When the entertainment unit is synchronizing with the advertising server, the entertainment unit will display a purchase screen that encourages the user to purchase a headset. The entertainment system will then switch to the video effect advertising channel. The video effect advertising channel transmits full motion video or billboards with no sound. The user cannot shut off the advertisements until a predetermined number of advertisements have played or a predetermined amount of time has elapsed. After that, the user will be able to shut off the advertisements. If the user does not switch off the system, it will continue to show advertisements until the ultrasound or other user presence detection interface senses that there is no user in the vicinity of the entertainment system. The system then returns to an initial state, ready for the next user.

There is also potential for "further information" advertisements. In the most flexible case, the user could opt for a further information advertisement. In that case, the system could run more detailed advertisements, initiate a mail-out, or even allow purchases to be made. In the less flexible case, where users do not have dedicated channels, a further advertising channel could be added to the system which would be time division multiplexed between systems.

It is one technical advantage of the system that the visual display of the entertainment unit cannot be switched off and the user cannot switch stations until a predetermined number of advertisements have been played or a predetermined amount of time has elapsed.

It is another technical advantage of the system that the headset cannot be switched to other bands until a predetermined number of advertisements have been played or a predetermined amount of time has elapsed. Thus, it is one feature of the invention that the headsets in this system are capable of receiving multiple channels within multiple bands, where one or more bands' need not be a commercial band.

It is another feature of the invention that the advertising server can transmit both full effect advertising and video effect advertising.

It is still another feature of the invention that the advertising system can be used both with and without headsets.

It is a further feature of the invention that the server can keep a record of which advertisements have been displayed to which user.

It is a still further feature of the invention that the advertising system can be activated by control signals, physical contact, or by sensors detecting the presence of users.

It is a still further feature of the invention that the advertising system provides captive viewers to the advertisers, who cannot switch channels during the display of the advertisements.

It is a still further feature of the invention that the system is easy to use and does not require system operators to load new advertisements or check the status of old advertisements.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying the disclosed structures or designing other structures for carrying out the same purposes as the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

The operation of a system for decoding from one fixed channel of the 900 MHZ band down to an FM intermediate band in the 88–108 MHZ range for subsequent demodulation by a conventional receiver is taught in the above-referenced Borchardt patent and will not be again repeated herein. Use of the FM band outside the commercial (88–108 MHZ) range is contemplated herein so as to avoid the possibility of commercial FM radio band interference. However, it should be pointed out that the system could be designed so that each band demodulates down to an intermediate band other than the FM band, or that the carrier of IF frequencies can be different.

Figure 1:
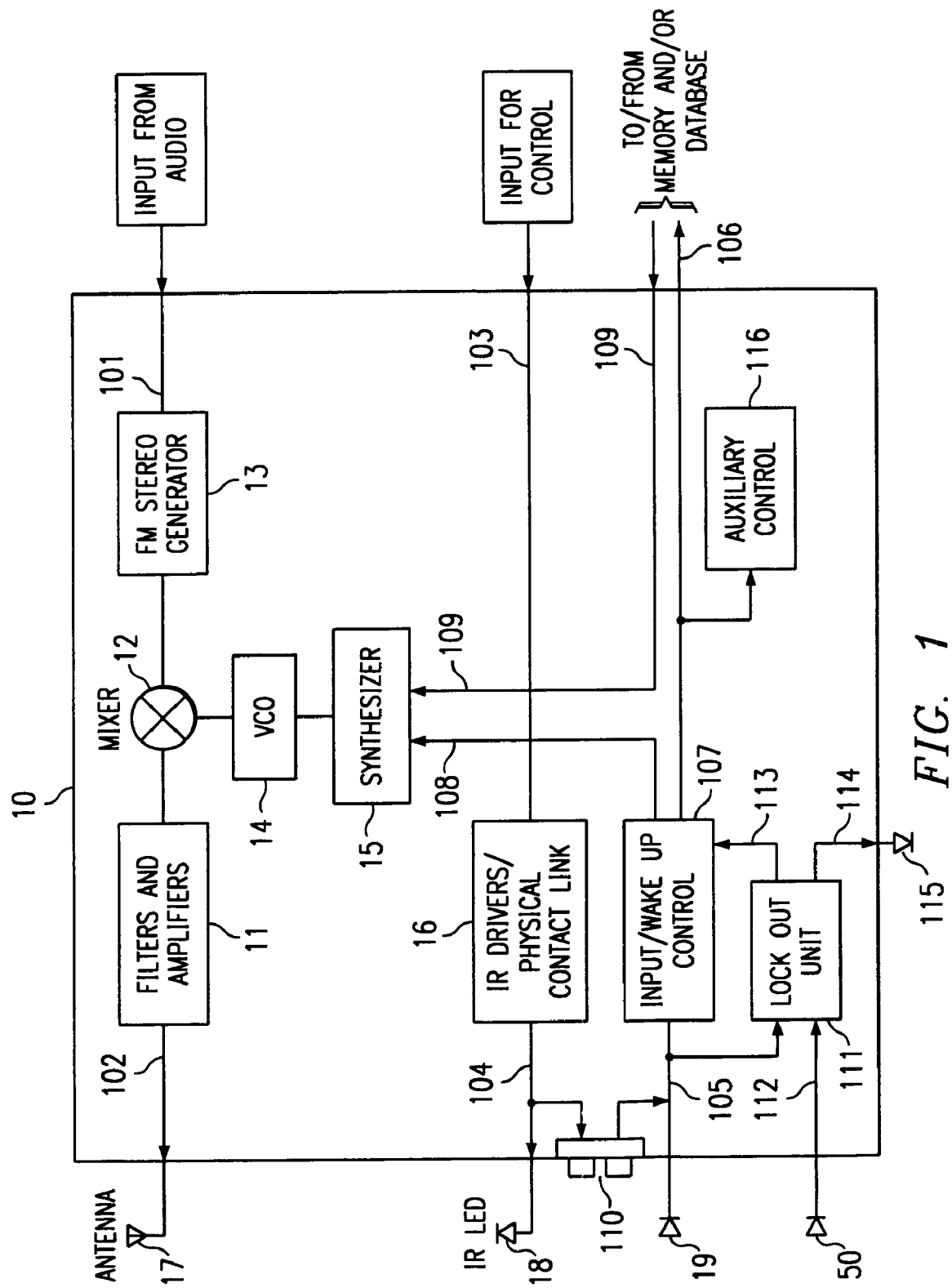
FIG. 1 shows a block diagram of a transmitter for use with the inventive system.

FIG. 1 shows a block diagram of the electronics within transmitter 10. Transmitter 10 consists of two major sections; the RF transmission block between input 101 and output 102, and the control and enable block between input 103 and output 104. Transmitter 10 can be on each unit 41 or could be in a central location or both.

The RF transmitter block transmits an RF modulated audio signal through antenna 17 after relevant amplification and filtering in box 11. The relatively high frequency in the 900 MHZ band is generated by synthesizer 15 with voltage controlled oscillator 14 tuning to one of up to 130 different channel frequencies, each spaced 200 KHz apart within the 902–928 MHZ band. The input audio, via input 101, which can be local programs, TV programs, satellite, CD, VCR, DVD, advertisements, or any other type of input is frequency modulated in box 13 before being added to the carrier frequency by mixer 12. The actual circuitry for these boxes is well known in the art.

The control block accepts formatted data via input 103 and provides it through control circuitry 16 to the IR transmitter LED 18 via output 104 and/or to physical contact 110. In the preferred embodiment, the other data includes a channel number (0 through 129) as well as volume information. As will be discussed, whenever receiver 20 (FIG. 2) sees control data representing a channel, it switches into RF mode using the given channel number. If there is no channel data, receiver 20 switches to a preset channel. Based upon a return of data, or identity, from a particular receiver, via diode 19 or via contact 110, input/wakeup control 107 can send a signal so that transmitter 10 can be set to not provide any control information over output 18, or simply to turn off. In addition, if desired, the system can be set to not provide control information over diode 18 (or contact 110) unless a valid wakeup signal is provided on diode 19 (or contact 110). Furthermore, the system can be set to lock out the user so that the user can no longer change the channels or switch off the power on the transmitter for a predetermined amount of time or until a certain number of advertisements have played. Alternatively, if the user switches off the power, the advertisement would be replayed from the beginning once it is switched back on. This lock out system can be set upon receiving a signal over diode 19 or contact 110 or a sensor 50.

Auxiliary control 116 can be used to turn on other functions, such as a TV, a graphics display, or selection menus and could be geared to the user's ID.

Figure 2:
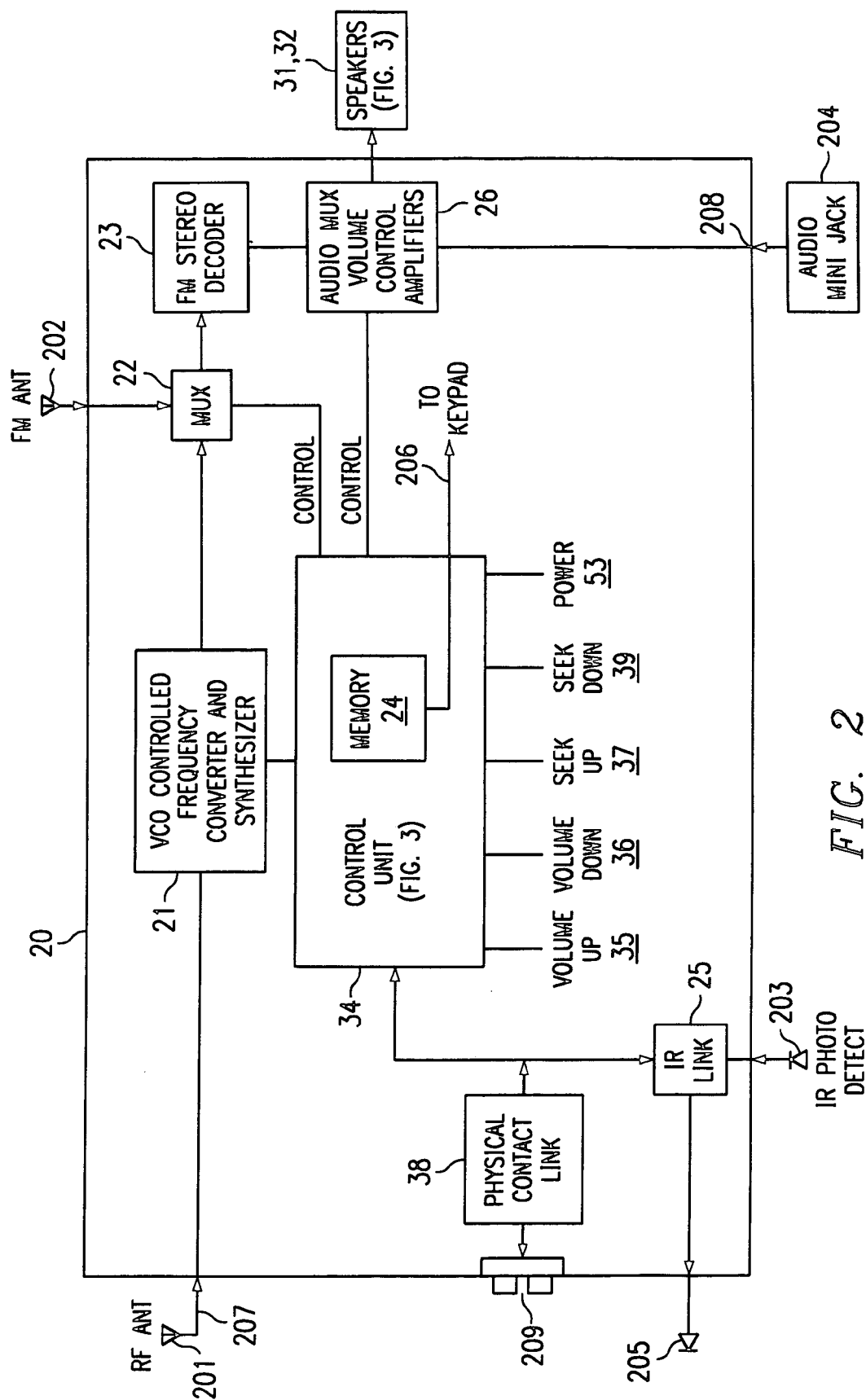
FIG. 2 shows a block diagram of a receiver for use with the inventive system.

FIG. 2 shows a block diagram of the electronics within receiver 20. Receiver 20 can, in one embodiment, operate in two modes: FM mode and RF mode.

Figure 3:
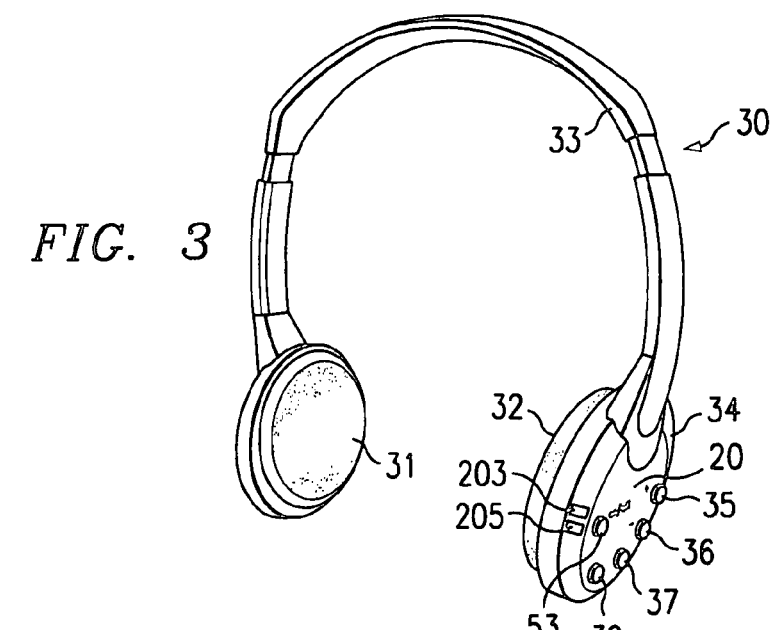
FIG. 3 shows a typical headset for use with the invention.

In FM mode, FM antenna 202 picks up commercial band FM broadcasts which are then transferred through audio multiplexer 22 to FM stereo decoder 23 which serves to demodulate the signal and "tune" the band between 88–108 MHZ, to arrive at the desired station or channel. Once the desired channel has been decoded, it is scaled and amplified in box 26 before being sent to speakers 31, 32 (FIG. 3). Note that the system can have multiple band operation or single band operation.

The RF mode here differs from the FM mode in more than just carrier frequency. The RF mode involves the use of a local transmitter, located within the gym (or other facility), broadcasting specifically for the audience of users contained within the facility. In RF mode, RF antenna 201, which may or may not be the same as FM antenna 202, passes the higher frequency signal through voltage controlled oscillator and variable frequency down converter 21 and thereafter through audio multiplexer 22 and FM stereo decoder 23 to speakers 31, 32. While not shown, in this mode FM antenna 202 is isolated from the circuit by a switch or by mux 22 input. As will be seen, the exact decoding frequency in VCO 21 is set depending upon the frequency (or channel) of the transmitting device, by a signal received external to receiver 10 and serves to extract from the RF input a specific intermediate frequency within (or adjacent to) the FM band. To protect against commercial band FM interference, the intermediate frequency, preferably, would be below 88 MHZ or above 108 MHZ. This would be a fixed, non-tuneable frequency to be converted by the FM decoder 23, for use by speakers 31, 32.

In either mode, audio from audio mini jack 204 can be selected through audio multiplexer 26.

Control unit 34 (shown also in FIG. 3) controls the state of audio multiplexers 22 and 26, the frequency of down converter 21, and senses if audio mini jack 204 is in use.

In one embodiment, IR photo detector 203 (or contact 209 in conjunction with physical contact line 38) senses IR control signals and passes them through IR decoder link 25 and/or link 38 to control unit 34. Control unit 34 decodes the control data, and processes the data if it is in the proper format. The control data controls down converter 21 and, if desired, the volume. There would typically be five manual control switches located on the headset. These are: Volume Up switch 35, Volume Down switch 36, Seek Frequency Up switch 37, Seek Frequency Down switch 39, and Power switch 53.

As discussed above, the control signals from transmitter 10 may not be sent until a wakeup signal exchange occurs. This signal exchange can occur via contacts 209 or via diode 203 and/or diode 205.

Using a variable frequency down converter 21 on 900 MHZ antenna 201 results in a fixed frequency input to FM decoder 23. The filtering and impedance matching between the antenna and FM decoder 23 can then be performed more accurately, resulting in a better quality signal.

In a low voltage application, a higher voltage differential is required to tune a further range in the FM decoder. For example, more voltage swing is required to tune from 85 MHZ to 111 MHZ than is required to tune from 88 to 108 MHZ. In a low voltage application, this extra voltage swing is expensive. To properly receive the 902–928 MHZ band, it would be desirable to down convert outside the FM band, requiring a frequency range of, for example, 59–87 MHZ or 109–137 MHZ, when using a fixed frequency down converter. Using a variable frequency down converter allows us to target outside the FM band (e.g. from 87 to 109 MHZ) without requiring significantly more voltage swing. This variable frequency down converter 21 allows access to the entire 902–928 band (26 MHZ bandwidth) without increasing the tuning voltage of the FM decoder (only 20 MHZ bandwidth) even when down converting to a range within the FM band.

Control unit 34 could also contain a switch which could prevent the headset from switching to the RF mode (or the reverse), thereby allowing the user to continue listening to whatever band the user desires without automatic switching. There could be an override capability so that under certain situations, information as decoded from the IR channel will cause the headset to switch to a certain RF channel without regard to the position of the switch. For example, this would be useful for transmitting emergency information in certain situations.

The control link, as discussed above, can be made bidirectional via diode 205 or via contact 209 under control of memory 24 in control unit 34. Memory 24 could have fixed data therein or could receive data, including voice, from a miniature keypad/microphone 206. The keypad could be used to input data pertaining to the user, user preferences, etc. This data could then be sent, via diode 205 (or contact 209), to transmitter 10 for reception by diode 19 (or contact 110). This information then could be fed to an external memory (not shown) via control 107 and paths 105, 106 respectively. This data could be used, for example, to place on the channel, via leads 108 and 109 and synthesizer 15, data, including audio or video (including advertisements), particular to the user's requirements.

The photo-detect diodes and the LED diodes as well as the actual signaling technique are well-known in the art.

Also, while not shown, a tighter link could be used for control purposes between the headset and the transmitter. For example, physically touching the two devices could serve to transfer information, much as data is transferred by swiping a magnetic card (or smart card) across a proper pad.

FIG. 3 depicts a typical headset 30 having speakers 31 and 32 coupled together by headband 33 which is adjustable to fit around a user's head. The wireless headset 30 may have an integral video display (not shown) attached to the headset. Moreover, the headset 30 may have a right and left integral video displays for producing a 3D effect (not shown). Mounted on the outside of speaker 32 is housing 34 which contains the receiver shown in FIG. 2 including the control switches 35, 36, 37, 39 and 53. Also mounted on the housing are IR diodes 203, and 205. Of course, any of the switches and diodes can be mounted in any position consistent with the desired operational requirements, or could be removed and replaced with controls which respond to spoken commands.

Figure 4:
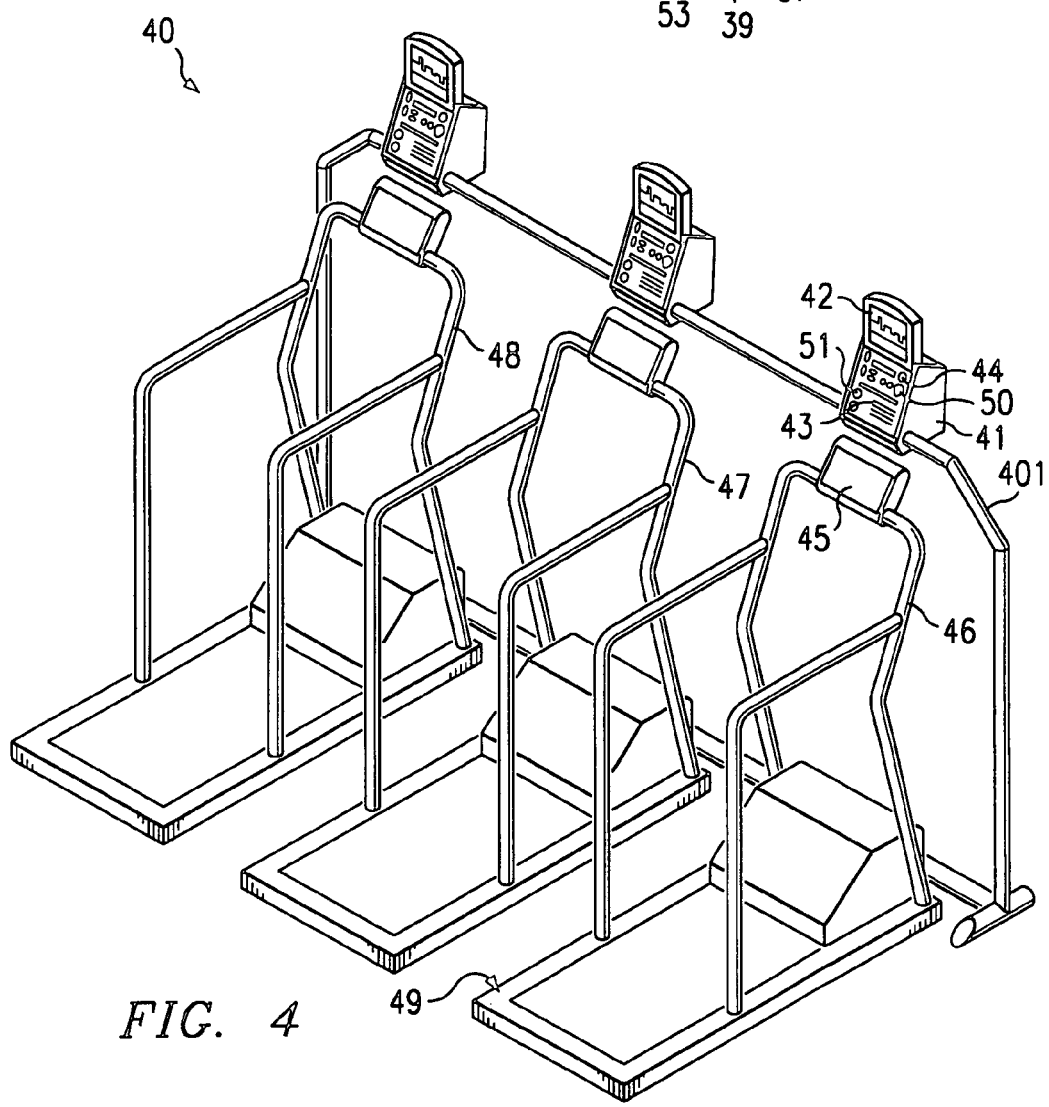
FIG. 4 shows one typical use of the inventive system.

FIG. 4 shows a set of entertainment units in a condition where they are able to initiate the delivery of information and control the content of information displayed on the respective screens based on the detection of a user's presence. System 40 is shown having multiple treadmills 46, 47, 48 in a gym environment with each treadmill having a screen 42 for the display of visual data, such as advertisements, billboards, and video data. Each treadmill also has a control box 41, control panel 43, interactive control 44, a user presence detection sensor 50 and a push button 51. Additional information, including advertisements, can be displayed via panel 45, if desired. The user (not shown) wearing headset 30, steps on platform 49 of treadmill 46 which tends to align diodes 203, 205 with diode(s) 44 for the exchange of channel control information and other data. In another embodiment, the user would push the button 51 and initiate data transfer between the headset and the treadmill. Headset 30 then, upon receipt of control signals, tunes to the channel assigned to treadmill 46. A check for validity may precede the tuning of the headset to the channel assigned to the treadmill. The check for validity may be required to ensure that the user is currently a member of the facility and that the headset is assigned to the user. A user without a headset is detected by sensor 50. The sensor 50 that detects the presence of the user in the proximity of the treadmill could operate via ultrasound, motion, IR, sound, light, applied manual pressure, heat or air pressure. An ultrasound, or other user presence detection sensor detects a return signal bouncing off of a user that is in proximity to the treadmill. A motion sensor detects the presence of a user due to movement in proximity to the treadmill. A light sensor detects the presence of a user by a change in the ambient light near the treadmill. A sound sensor detects a user by a change in the sound level or on recognizing the occurrence of certain patterns of sound in proximity to the treadmill. An applied manual pressure sensor detects the presence of a user when a user steps on the treadmill by sheer force of the user's weight. If the user had stepped onto the next adjacent treadmill, a different channel (or band) would be assigned to that user's headset simply based on the physical location of the user. Diodes 203, and 205 transmit IR signals. However, momentary contacts can be made, as discussed above, and the control information passed on in that manner. While physical contact is enabled, it will be understood that data transfer can occur by, for example, magnetic elements coming into close proximity, as is done with the "swiping" of a credit card. A heat sensor detects a user due to the body heat emitted by the person while in proximity to the sensor. An air pressure (in contrast to the "manual pressure" sensor which depends on physical contact and: force) sensor detects a user by noting changes in air pressure resulting from either the motion or breathing of the user in proximity to the sensor.

Figure 5:
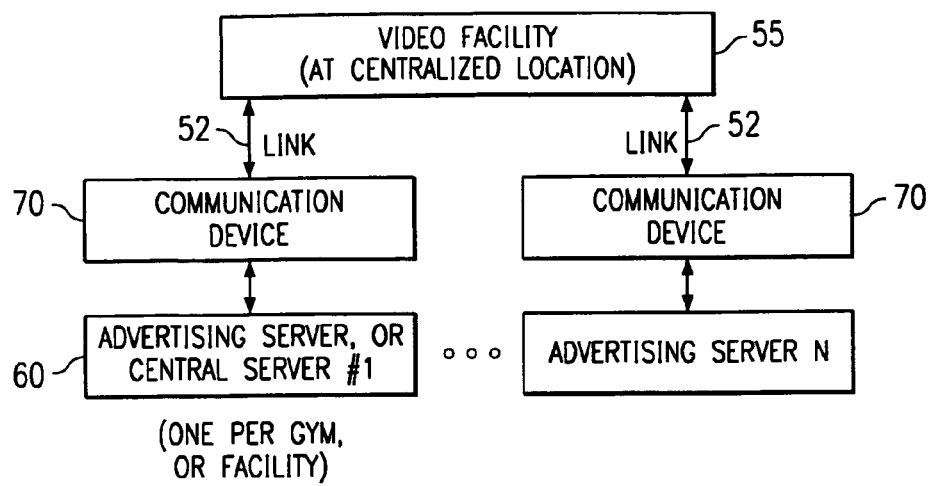
FIG. 5 shows a block diagram for downloading and uploading information between a video facility and an advertising server.

FIG. 5 shows a block diagram for downloading and uploading information between the central office and an advertising server. A video facility 55 is maintained at a centralized location. Each of the unit locations or clubs having the entertainment system has a central server called the advertising server 60. The advertising server 54 is connected to the video facility 55. The two locations communicate via a communication device 70, typically a modem, ISDN link, or other acceptable methods so that new advertisements can be downloaded to the server via link 52. The server also uploads control and other system status information to the video facility. This information includes, but is not limited to, the status of old advertisements, the number of times a particular user has seen a particular advertisement, and the number of times a particular advertisement was shown on particular days. This information can be used for billing and for other purposes. Link 52 can also be used to send emergency broadcast messages to the advertising servers.

Figure 6:
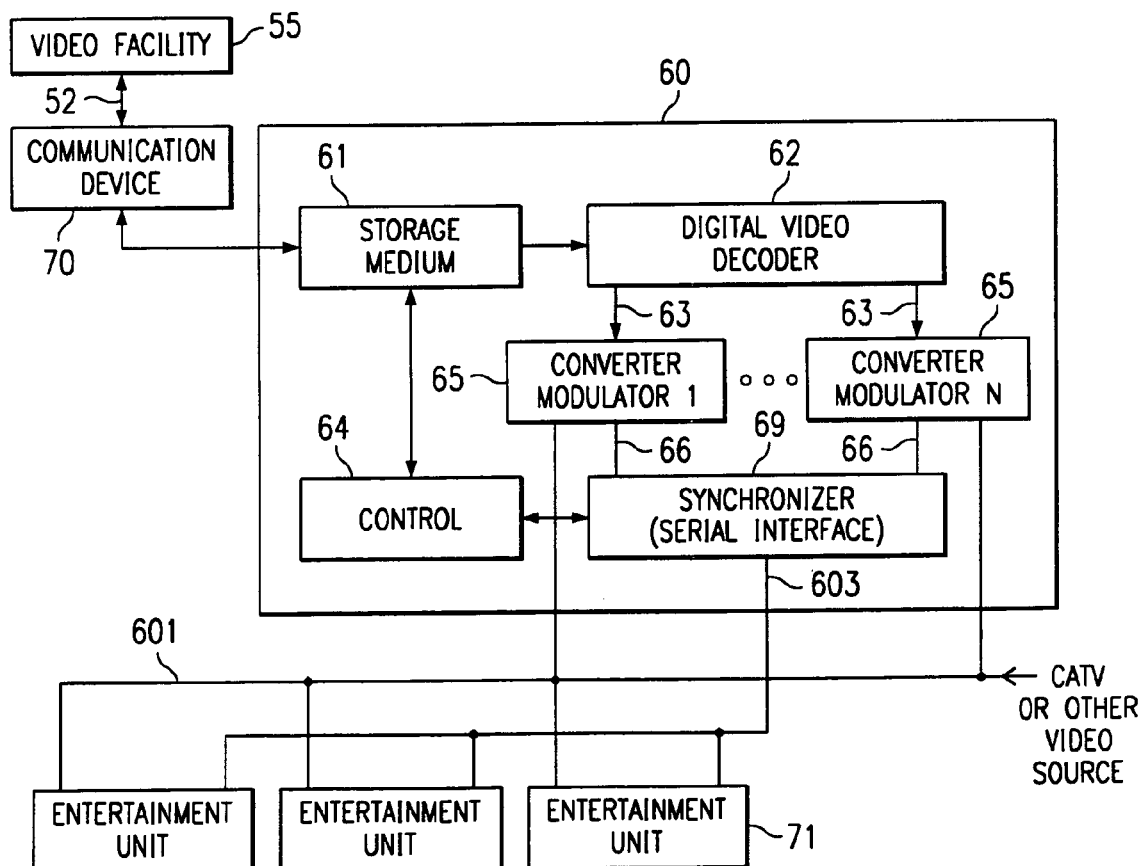
FIG. 6 shows a block diagram of an advertising server connected to a series of entertainment units.

FIG. 6 shows a block diagram of an advertising server 60 connected to a series of entertainment units 71, examples of which are depicted in FIG. 4. The advertising server 60 is preferably a personal computer (not shown in its entirety) with a storage medium 61. A communication device 70 downloads new advertisements from the video facility with the aid of link 52, and stores them in storage medium 61. The link 52 could be a T1, T3, ISDN, or telephone connection, or it can be an optical link, as needed by data transfer requirements. The storage format can be RAM, a ROM, a CD, floppy disk, hard drive, or DVD or other format provided for using magnetic, electronic, optical or laser media. The advertisements are stored preferably in digital form in the storage medium. The database of advertisements is stored in the storage medium. The advertisements are decoded and transformed into analog form by a digital video decoder 62. Of course, if the visual display is capable of display data in digital format then the conversion from digital to analog form is not required at this point in the system, but may be located in the entertainment units to convert the audio portion of the data into analog format for reception by the headset 30. Moreover, if the headset is capable of receiving data in digital form then no analog conversion is required.

The digital video decoder 62 has at least one channel 63 attached to it, one for video effect advertisements and the other for full effect advertisements. The video effect advertisements include full motion video and billboards without sound. The full effect advertisements include full motion video and billboards with sound. Other channels (not shown) could be used for a menu-driven video selection library. The two converter/modulators 65 are used to add the outputs of the video decoder onto the cable line 601. The outputs from the two converter units are also fed into a synchronizer via lines 66. The synchronizer includes software so that the entertainment units can synchronize with the advertising channels to enable the advertisements on each entertainment unit to be displayed from beginning to the end, or chronologically.

In the least flexible case, the synchronizer can also be used to time division multiplex the different advertisements between the users, so that the users can be individually targeted. For example, if three users share one TV channel and three advertisements are shown on startup, at least one advertisement can always be targeted to each individual. As it is unlikely that all three users start at the same time, it is very possible that two or even all three advertisements could be individually targeted. The synchronizer 69 interacts with the entertainment units so that they may synchronize with the advertisements on the various channels. The synchronizer 69 is connected to the entertainment units by way of line 603. Control 64 schedules the video (or audio) onto the channels based on who is logged on the entertainment systems, the time of day, the geographic location, stored preferences, prior requests, etc.

If desired, information from the user's headset from memory 24 could be sent through diode(s) 44 of device 41 (or via momentary contact) which could, for example, tell the user that he/she is due for 30 minutes at a certain pace. Alternatively, a central memory and processor (not shown) could actually adjust the speed of machine 46 and the slope of platform 49, as well as play advertisements to the user over the unique channel now identified with the user or via the visual display mounted on the stationary machine. Once this information has been passed to the user, the system could revert to providing more community oriented information content tailored to anyone of a number of parameters or the user could put his/her own CD (or cassette tape, DVD, or VCR tape) into a player (not shown) mounted in unit 41 for a more tailored performance.

Of course, there can be multiple layers of control information coming to the user. For example, the user could be walking outside and listening to traditional AM or FM on headset 30. When the listener enters a building, such as the gym, signals from the channel control unit mounted inside the gym are picked up by the detector in the headset and the headset switches to either a predetermined RF channel or to a channel identified in the control transmission. The exact channel to which the headset is tuned can change as the listener moves through the gym as discussed above.

While IR has been identified as the control transmission media, it is understood that any transmission mechanism can be used, including magnetism, light, temperature, and radio waves. In addition, since the headset channel is altered by a control signal, the headset can have any one of a number of sensors mounted therein which, when triggered, will serve to tune the radio to a specific channel. A low signal level condition, or the activation of a sensor, such as a $CO_2$ sensor, or a pulse/heart rate sensor, could cause such a shift of bands/channels and the playing of a "special" message. The channel setting of all headsets and also the display panel could shift on command to an emergency channel to warn users of an emergency.

When an advertising server 60 is set up at a facility, the Video Facility 55 located in a central office downloads the advertisements to the advertising server using software. These advertisements are stored in a storage medium 61 associated with the advertising server. The storage medium acts like the database for a particular facility. Of course, the central server located in the central office also has a database of advertisements and other information. If necessary, each entertainment unit may have its own individual database. When a user steps on platform 49, the treadmill detects the presence of the user. Screen 42, or panel 45, or both, will display a welcome screen which is provided by the advertising server. The welcome screen could also be tailored to and stored in each entertainment unit. In the most flexible case, each entertainment unit will have its own welcome screen either stored in the unit itself or provided by the advertising server. In the case of a user without a headset, the unit will display a purchase (generic) screen instead of a welcome screen, encouraging the user to purchase a headset. At the same time, a lock out unit 111 (FIG. 1) in each entertainment unit will lock out the user based on signals received via diode 19, or physical contact 110 (FIG. 1), or sensor 50 (FIG. 1). The lock out unit will also send a signal to headset 30 which will be received by diode 211 to disable the control switches 35 and 36. Once a user is locked out, the channels or switches on the entertainment unit or the headset cannot be changed, and/or the unit cannot be switched off.

At this time software associated with the advertising server 60 (FIG. 6) would retrieve the advertisements from the database stored in the storage medium 61. These advertisements are passed through the digital video decoder 62, which converts them from digital to analog form. Of course, if all elements of the system were digital, the conversion would be unnecessary. The digital video decoder will then transmit the advertisements onto channels 63 or 64 depending on whether the advertisements are with or without sound. These channels are connected to converters 65 which would insert the video effect and full effect advertisements onto the cable line 601. The synchronizer 69 includes software so that the entertainment units can synchronize with the advertising channels to enable the units to display the advertisements from beginning to the end. The advertisements are then displayed onto the visual devices 42 and/or 45 associated with the entertainment units. For users with headsets, the audio will be transmitted to speakers 31 and 32 (FIG. 3). After a predetermined number of advertisements have played or a predetermined amount of time has elapsed, the lock out system will be disabled or disengaged, allowing the user to switch stations or switch off the entertainment units. Periodically the advertising server will upload system status information and advertisement usage information to the central server by special software designed for this purpose. The sources for geographically remote systems can be linked to a common server by any well-known means, including an Internet connection.

Although the present invention and its advantages have been described in detail, it should be understood that various changes, substitutions and alterations can be made herein without departing from the spirit and scope of the invention as defined by the appended claims. For example, while we have been discussing audio, the same concepts could be applied to video or to data transmission using other than the bands described herein.

What is claimed is:

1. A transmitter comprising:
means for transmitting data to at least one of a plurality of remote receivers over a particular transmission channel;
means for controllably disabling at least one control on the one remote receiver so that the particular transmission channel cannot be switched by a user of the one remote receiver until delivery of a predetermined number of advertisements related to the transmitted data to a particular user; and
means for reactivating any disabled control on the remote receiver in response to the delivery of the predetermined number of advertisements to the particular user.

2. The invention set forth in claim 1 wherein the data originates from at least one of a plurality of different input sources selected from the group consisting of TV, cable, VCR, DVD, satellite broadcast, telephone, a database, and combinations hereof.

3. The invention set forth in claim 1 further comprising: means for detecting a presence of a user in proximity to said transmitter.

4. The invention set forth in claim 3 further comprising: means for tuning the one remote receiver to the particular channel based on a momentary connection between the receiver and the transmitter.

5. The invention set forth in claim 3 wherein the means for detecting comprises: means for tuning the one remote receiver to the particular channel based on a control signal exchanged between the receiver and the transmitter.

6. The invention set forth in claim 3 wherein the means for detecting further comprises: a sensor and wherein a mode of operation of the sensor is chosen from the group consisting of ultrasound, motion, IR, sound, light, applied manual pressure, heat, air pressure, and combinations thereof.

7. A transmitter comprising:
means for transmitting data to at least one of a plurality of remote receivers over a particular transmission channel;
means for controllably disabling at least one control on the one remote receiver so that the particular transmission channel cannot be switched by a user of the one remote receiver until at least one advertisement is delivered and a predetermined amount of time has passed; and
means for reactivating any disabled control on the remote receiver in response to the passage of a predetermined amount of time the transmitted data is delivered.

8. The invention set forth in claim 7 wherein the data originates from at least one of a plurality of different input sources selected from the group consisting of TV, cable, VCR, DVD, satellite broadcast, telephone, a database, and combinations hereof.

9. The invention set forth in claim 7 further comprising: means for detecting a presence of a user in proximity to said transmitter.

10. The invention set forth in claim 9 further comprising: means for tuning the one remote receiver to the particular channel based on a momentary connection between the receiver and the transmitter.

11. The invention set forth in claim 9 wherein the means for detecting comprises: means for tuning the one remote receiver to the particular channel based on a control signal exchanged between the receiver and the transmitter.

12. The invention set forth in claim 9 wherein the means for detecting further comprises: a sensor and wherein a mode of operation of the sensor is chosen from the group consisting of ultrasound, motion, IR, sound, light, applied manual pressure, heat, air pressure, and combinations thereof.

* * * * *